Jan. 28, 1936. D. L. LOTTS 2,028,876
CLUTCH MECHANISM
Filed Nov. 16, 1932 2 Sheets-Sheet 1

Witness:
Chas. R. Koursh

Inventor,
Delbert L. Lotts
Parkinson + Lane, Attys.

Jan. 28, 1936.  D. L. LOTTS  2,028,876
CLUTCH MECHANISM
Filed Nov. 16, 1932  2 Sheets-Sheet 2
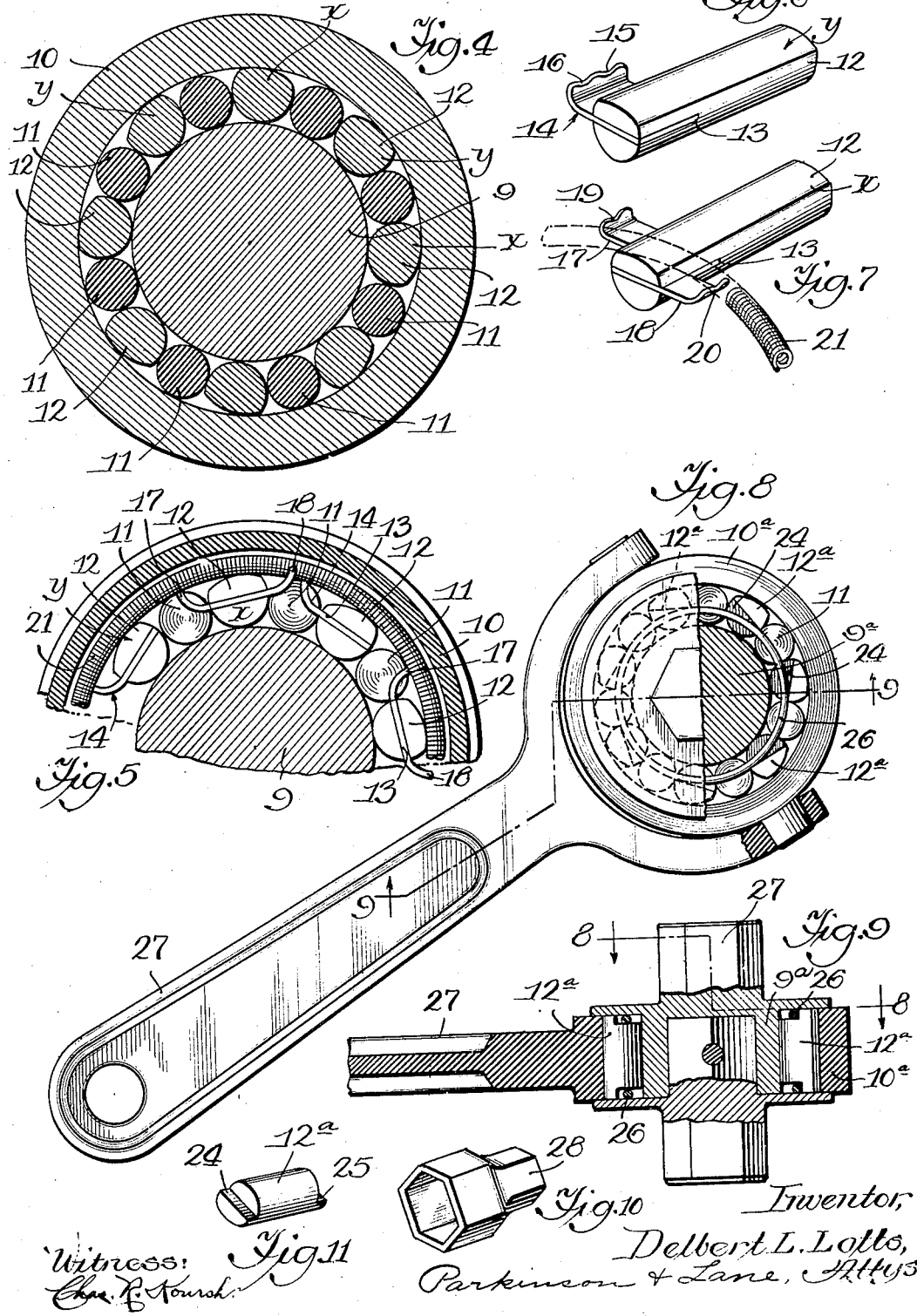

Patented Jan. 28, 1936

2,028,876

UNITED STATES PATENT OFFICE 2,028,876

CLUTCH MECHANISM

Delbert L. Lotts, Chicago, Ill.

Application November 16, 1932, Serial No. 642,844

18 Claims. (Cl. 192—48)

This invention relates to a clutch mechanism and more particularly to such mechanism as will lock together driving and driven parts for rotation together in either direction, or permit free wheeling when desired.

One of the objects of my invention is to provide an improved clutch mechanism for use in any connection desired, as automobiles or other mechanism, whereby the driving and driven parts may be locked for rotation together in either direction, or for free wheeling as desired.

A further object is to provide such clutch mechanism as to be practically free from wear caused by the driving rollers.

A further object is to provide such device that the outer shell cannot be distorted, but has a uniform radial thrust.

Another object is such an arrangement that the non-circular rollers are constantly changing their location over both the inner and outer raceway surfaces whereby they do not form local depressions, and hence result in continuous, positive and reliable action.

A still further object is to provide a clutch mechanism in which the parts may be set for free wheeling at high speeds as well as low without clashing of parts.

Other objects, advantages and capabilities will hereinafter more fully appear.

My invention further resides in the combination, construction and arrangement of parts illustrated in the accompanying drawings, and while I have shown therein preferred embodiments I wish the same to be understood as illustrative only and not as limiting the scope of my invention.

In the drawings:—

Fig. 4 is a section on the line 4—4 of Fig. 3, showing the parts in position for use with a conventional clutch.

Fig. 5 is a fragmentary view similar to Fig. 2, but showing the parts in position for free wheeling.

Fig. 6 is a perspective view of one of the wedging rollers adapted for wedging action in one direction only.

Fig. 7 is a perspective view of another one of the wedging rollers adapted for wedging action in either direction.

Fig. 8 is a plan view partly in section of a ratchet wrench having my invention applied thereto.

Fig. 9 is a sectional view taken on the line 9—9 of Fig. 8, but with a portion of the two hexagonal lateral projections in elevation.

Fig. 10 is a perspective view of a socket wrench adapted to be applied to one or the other of the lateral projections of the wrench.

Fig. 11 is a perspective detail of one of the rollers of the ratchet wrench of Figs. 8 and 9.

Figure 1:
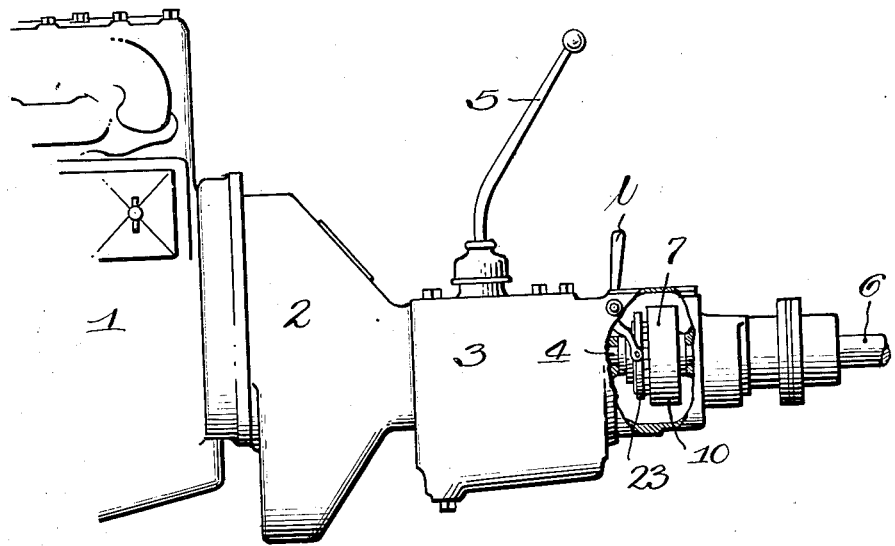
Fig. 1 is a fragmentary side elevation of a portion of an automobile engine and associated gear housing, the latter being partly in section to show my improved clutch mechanism therein.

Referring more in detail to the drawings, the internal combustion engine 1 of an automobile, or the like, is provided with the usual clutch casing 2, transmission gear casing 3, drive shaft 4 and gear shifting lever 5. Between the drive shaft 4 and the driven shaft 6 is located my improved clutch mechanism 7, shown more in detail in Figs. 2–7.

Figure 2:
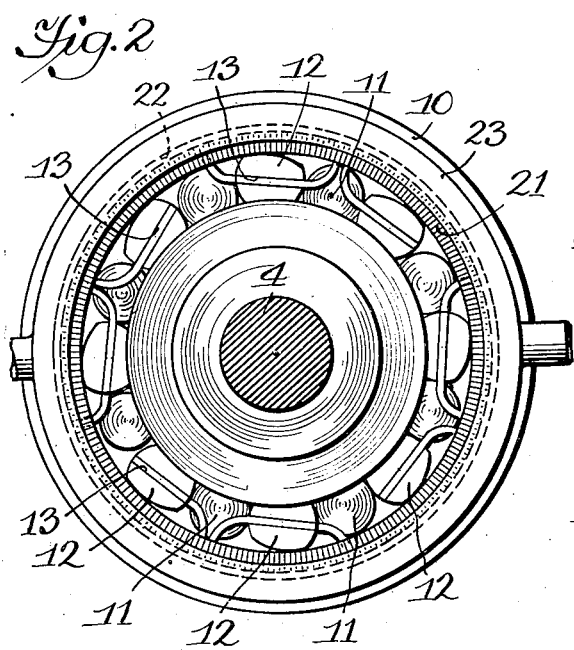
Fig. 2 is an end elevation of the clutch mechanism of the present invention and showing the parts in position for use with a conventional clutch, whereby the driving part may drive the driven part in either direction of rotation.
Figure 3:
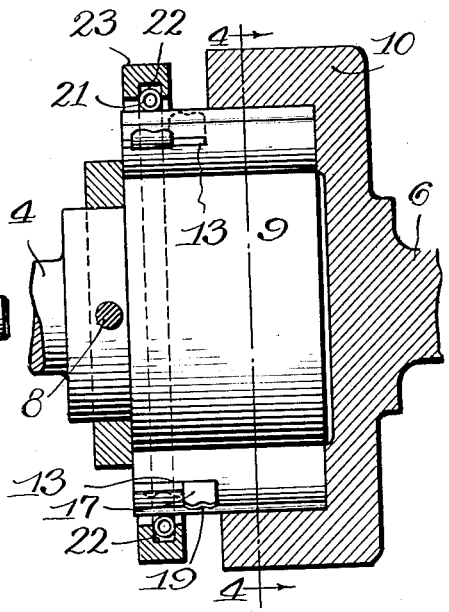
Fig. 3 is a vertical longitudinal sectional view through Fig. 2, but showing the inner raceway in elevation.

Referring more particularly to Figs. 2 and 3 the drive shaft 4 has fixed thereto by pin 8, or the like, the inner raceway member 9. Formed integral therewith or otherwise fixed to the driven shaft 6 is the outer raceway member 10. The exterior surface of the inner raceway member 9, and the interior annular surface of the outer raceway member 10, are cylindrical and spaced apart a distance to accommodate the roller bearing members 11 and the non-circular wedging members 12. The roller bearing members 11 are of such diameter as to just nicely fill the space between the members 9 and 10, so that a smooth roller bearing is provided for these parts without undue looseness. The non-circular members 12, which are in effect flattened on one side, are at their smallest diameter a little less in diameter than the roller bearings 11, but at their largest diameter exceed the diameter of roller bearings 11. In other words, the shortest diameter of the non-circular members 12 is a little less than the annular space between members 9 and 10, while the larger diameter is greater than the distance between elements 9 and 10 across the annular space. The so-called flattened portions of members 12 are, as will be obvious, not concentric with the remaining portions of the circumference of these members, hence when any of these members 12 are slightly rotated on their axis they immediately are forced into wedging action with the inner surface of member 10. This wedging movement causes a binding action and fastens members 9 and 10 for rotation together when this wedging action occurs. On the other hand, however, when members 12 are rotated to bring the smallest diameter to extend across the annular space between members 9 and 10 this wedging or binding action does not occur, and members 9 and 10 are then free to rotate relatively to each other. This is one of the important features of this invention.

As shown in Figs. 6 and 7, each flattened member 12 is provided with a kerf 13 extending a substantial distance into one end. In every alternate flattened member 12, which for clearness will be designated y, a laterally extending rigid member 14 is fixed in the kerf 13 to extend a substantial distance laterally to the left of the flattened member 12, as seen in Fig. 6. The free end of member 14 is turned upwardly at approximately a right or other suitable angle, and its upper edge is formed with two notches 15 and 16. The alternate set of flattened rollers 12, the individual ones of which fall in between the ones carrying the members 14, are each provided with lateral members 17 and 18, each of which is one-half the width of member 14. For convenience the flattened members 12 carrying the two lateral members 17 and 18 will be hereafter referred to as x. Member 17 is set inwardly from the end of flattened member 12, and is formed on its flanged end with a groove 19, which when the parts are assembled falls in circumferential alignment with notch 15. The lateral member 18 is positioned between member 17 and the end of roller 12, and is formed on its flanged end with a notch 20, which when the parts are assembled falls in circumferential alignment with notch 16. Circumferentially extending around the assembly of rollers is a circular endless coiled spring 21, which rests within the annular groove 22 of the shifting ring 23, whereby this annular coil spring may upon lateral shifting of ring 23, by means of lever l, be moved from circumferentially aligned notches 16 and 20 into circumferentially aligned notches 15 and 19, or vice versa, for a purpose to be hereinafter more fully set forth.

Assuming the endless coil spring 21 to be moved by the shifting ring 23 into the circumferentially aligned notches 16 and 20, the flattened rollers x and y will respectively occupy the positions shown in Figs. 2 and 4, with the upper portions of members y slightly rotated to the left, as seen in Figs. 2 and 4, and the upper portions of members x slightly rotated to the right. This means that the flattened rollers y will be moved into such position that they will wedge between members 9 and 10 in such manner that the driving member 9 will drive the driven member 10 in a clockwise direction, as viewed in Fig. 4. Also the flattened rollers x will be brought into a position such that they will wedge between driving member 9 and driven member 10 when driving member 9 rotates in a counter-clockwise direction. This means that in the position of parts shown in Figs. 2 and 4 the driving member 9 and the driven member 10 will be locked together for rotation together in either direction upon operation of the conventional clutch in clutch casing 2.

When, however, shifting ring 23 is shifted to the right, as viewed in Fig. 3, this will carry the annular coil spring 21 into the circumferentially aligned notches 15 and 19. As both members 14 and 17 extend to the left, as viewed in Figs. 6 and 7, this will cause all of the flattened rollers x and y to be rotated in the same direction, to-wit, in an anti-clockwise direction, as viewed in Fig. 5.

Fig. 5 shows this movement to have taken place with the result that each of the flattened rollers x and y are in a position such that when driving member 9 is rotated in a clockwise direction it will drive driven member 10 with it, for the reason that the flattened rollers are then in position to exert a wedging action between members 9 and 10 when the former is rotating in a clockwise direction. Assuming, however, that the clockwise direction speed of the driven member 10 exceeds that of the driving member 9 this will immediately relieve the wedging action set up by the flattened rollers x and y, and permit the driven member 10 to rotate faster than driving member 9. This is the free wheeling action of my invention and, as will be readily understood, is caused when the speed of an automobile, or other driven mechanism, exceeds that of the driving parts.

From the above it is seen that Figs. 2 and 4 show the rollers in position to lock the driven and driving parts together for joint rotation in either direction, so that the driven part may be driven in either direction by a conventional clutch; while Fig. 5 shows the rollers in position for free wheeling. As is also readily understood from the above, these two positions of parts are effected by moving the shifting member 23 to bring the coil spring 21 either into notches 15, 19 or 16, 20.

Figs. 8–11 show a modification of this invention as applied to a ratchet wrench, in which the cylindrical rollers 11 have alternately dispersed between them the flattened rollers 12a. These flattened rollers 12a are slightly longer than the cylindrical rollers 11, and the former have their ends notched as at 24 and 25 (see Fig. 11), within which notches lies a circular spring 26 so formed as to normally press outwardly on the adjacent portion of the shoulder of notches 24 and 25. If all of the rollers in this ratchet wrench were cylindrical after the manner of rollers 11 nothing would occur upon rotation of handle 27 except a free rotation of the rollers 11 in their raceway. Since, however, every other roller is a flattened roller 12a, whose minimum diameter is, as has been pointed out above in connection with the flattened rollers previously described, slightly less than the distance between the inner member 9a and the outer member 10a, when the handle 27 is rotated in a counter-clockwise direction, each of the flattened rollers 12a will be rotated a slight amount in a counter-clockwise direction, as viewed in Fig. 8, and will at once set up a wedging action between the outer member 10a and the inner member 9a. This counter-clockwise rotation of flattened rollers 12a is assisted by the outward pressure of springs 26 upon the adjacent portion of the shoulders of notches 24 and 25. This joint action of the outward pressure of the spring 26, together with the rolling action of flattened rollers 12a between members 9a and 10a, insures that the flattened rollers will roll into wedging position when the handle is being rotated in a counter-clockwise direction.

When, however, the handle member 27 is rotated a slight distance in a clockwise direction this wedging action is relieved, because of the sliding of the outer member 10a over rollers 12a in a direction opposite to that of the wedging action. This will be accompanied by a slight rotation of members 12a in a clockwise direction, which rotation will be stopped by springs 26 upon rollers 12a before they have rotated far enough to effect a wedging action on the other side. This creates sufficient distortion in springs 26 to again assist rotation of the flattened rollers 12a in the opposite direction to cause a wedging action when the handle 27 is again rotated in a counter-clockwise direction. This means that when the wrench handle is rotated in a counterclockwise direction, as viewed in Fig. 8, the members 12a will, due to the wedging action referred to, lock the parts 9a and 10a together, and thus rotate the hexagonal (or other shape) projections 27, over the lower of which projections is slipped a suitable socket member 28, which in turn will be placed over a nut for loosening or tightening the latter. When rotation of the nut in the opposite direction is desired the wrench is turned over for use of the opposite lateral projection 27. This gives a ratchet wrench which may be operated in either direction.

Having now described my invention, I claim:—

1. A clutch mechanism for connecting a drive shaft and a driven shaft, comprising a driving member, a driven member radially spaced from the driving member, and rollers in the space between said members, some of said rollers being cylindrical, and at least one of said rollers being non-circular in cross-section, and means for rotating said non-circular roller in one direction to cause it to lock the driving member and driven member for rotation together in one direction and for rotating said non-circular roller in the other direction to cause it to lock said members for rotation together in the opposite direction.

2. A clutch mechanism for connecting a drive shaft and a driven shaft, comprising a driving member, a driven member radially spaced from the driving member, and rollers in the space between said members, some of said rollers being cylindrical, and at least one of said rollers being non-circular in cross-section, and means for rotating said non-circular roller in one direction to cause it to lock the driving member and driven member for rotation together in one direction and for rotating said non-circular roller in the other direction to cause it to lock said members for rotation together in the opposite direction, said non-circular roller permitting the driven member to rotate faster than the driving member.

3. A clutch mechanism of the class described, comprising a driving member and a driven member, a set of rollers between said members, some of said rollers being cylindrical, and some being non-circular in cross-section, and means for causing a partial rotation of some of said non-circular rollers in one direction and some in the reverse direction.

4. A clutch mechanism of the class described, comprising a driving member and a driven member, a set of rollers between said members, some of said rollers being cylindrical and some being non-circular in cross-section, and means for operating in one position to cause a partial rotation of some of said non-circular rollers in one direction and some in the reverse direction, and in another position to cause a partial rotation of all of the non-circular rollers in the same direction.

5. A clutch mechanism of the class described, comprising a driving member and a driven member, a set of rollers between said members and contacting each other, some of said rollers being cylindrical and some non-circular in cross-section, and resilient means connecting said non-circular rollers for causing the driving and driven members to lock for rotation together in one direction, and to run free when the relative movement of said two members is in the opposite direction.

6. A clutch mechanism of the class described, comprising a driving member and a driven member, a set of rollers between said members, said rollers being alternately cylindrical and non-circular in cross-section and contacting each other, and resilient means for causing the driving and driven members to lock for rotation together in one direction, and to run free when the relative movement of said two members is in the opposite direction, said means comprising spring means acting upon the ends of the non-circular rollers.

7. A clutch mechanism of the class described, comprising a driving member, a driven member, a set of rollers between said members, said rollers contacting each other, some of said rollers being cylindrical and some non-circular in cross-section, and means connecting said non-circular rollers for causing partial rotation thereof in one direction so that the driving and driven members will lock and rotate together upon rotation of the driving member in one direction, and run free upon rotation of the driving member in the opposite direction.

8. A clutch mechanism of the class described, comprising a driving member, a driven member, a set of rollers between said members, some of said rollers being cylindrical to fill the space between said members, and some of said rollers being normally of larger diameter than the cylindrical rollers but partially cut away on one side, and means to partially rotate the cut-away rollers to lock the driving member and driven member for rotation together.

9. A clutch mechanism of the class described, comprising a driving member, a driven member, a set of rollers between said members, some of said rollers being cylindrical to fill the space between said members, and some of said rollers being normally of larger diameter than the cylindrical rollers but partially cut away on one side, and means to partially rotate the cut-away rollers to lock the driving member and driven member for rotation together, the cut-away rollers being of a diameter slightly less than the cylindrical rollers at the transverse center of the cut-away portion, and of a diameter greater than the cylindrical rollers at points away from said transverse center.

10. A clutch mechanism of the class described, comprising a driving member, a driven member, a set of rollers between said members, some of said rollers being cylindrical to fill the space between said members, and some of said rollers being normally of larger diameter than the cylindrical rollers but partially cut away on one side, and means to partially rotate the cut-away rollers to lock the driving member and driven member for rotation together, said means comprising lateral projections adjacent one end of the cut-away rollers, and spring means to cause movement of said lateral projections.

11. A clutch mechanism of the class described, comprising a driving member, a driven member, a set of rollers between said members, some of said rollers being cylindrical to laterally fill the space between said members, and some of said rollers being normally of larger diameter than the cylindrical rollers but partially cut away on one side, and means to partially rotate the cut-away rollers to lock the driving member and driven member for rotation together, said means comprising lateral projections on one side of some of said cut-away rollers, and lateral projections on both sides of some of said cut-away rollers, and spring means to cause movement of said lateral projections.

12. A clutch mechanism of the class described, comprising a driving member, a driven member, a set of rollers between said members, some of said rollers being cylindrical to laterally fill the space between said members, and some of said rollers being normally of larger diameter than the cylindrical rollers but partially cut away on one side, and means to partially rotate the cut-away rollers to lock the driving member and driven member for rotation together, said means comprising lateral projections on one side of some of said cut-away rollers, and lateral projections on both sides of some of said cut-away rollers, and spring means to cause movement of said lateral projections, each of those cut-away rollers that have lateral projections on both sides having the lateral projection on one side nearer the end of the roller than the lateral projection on the other side.

13. A clutch mechanism of the class described, comprising a driving member, a driven member, a set of rollers between said members, some of said rollers being cylindrical to laterally fill the space between said members, and some of said rollers being normally of larger diameter than the cylindrical rollers but partially cut away on one side, and means to partially rotate the cut-away rollers to lock the driving member and driven member for rotation together, said means comprising lateral projections on one side of some of said cut-away rollers, and lateral projections on both sides of some of said cut-away rollers, and spring means to cause movement of said lateral projections, each of those cut-away rollers that have lateral projections on both sides having the lateral projection on one side nearer the end of the roller than the lateral projection on the other side, each of said lateral projections having an upturned flange provided with one or more notches.

14. A clutch mechanism of the class described, comprising a driving member, a driven member, a set of rollers between said members, some of said rollers being cylindrical to laterally fill the space between said members, and some of said rollers being normally of larger diameter than the cylindrical rollers but partially cut away on one side, and means to partially rotate the cut-away rollers to lock the driving member and driven member for rotation together, said means comprising lateral projections on one side of some of said cut-away rollers, and lateral projections on both sides of some of said cut-away rollers, each of those cut-away rollers that have lateral projections on both sides having the lateral projection on one side nearer the end of the roller than the lateral projection on the other side, each of said lateral projections having an upturned flange provided with one or more notches, and a circular coil spring seating in the circumferentially aligned notches to cause movement of said lateral projections.

15. A clutch mechanism of the class described, comprising a driving member, a driven member, a set of rollers between said members, some of said rollers being cylindrical to laterally fill the space between said members, and some of said rollers being normally of larger diameter than the cylindrical rollers but partially cut away on one side, and means to partially rotate the cut-away rollers to lock the driving member and driven member for rotation together, said means comprising lateral projections on one side of some of said cut-away rollers, and lateral projections on both sides of some of said cut-away rollers, each of those cut-away rollers that have lateral projections on both sides having the lateral projection on one side nearer the end of the roller than the lateral projection on the other side, each of said lateral projections having an upturned flange provided with one or more notches, and a circular coil spring seating in the circumferentially aligned notches to cause movement of said lateral projections, and a shifting element for shifting the circular coil spring from one set of circumferentially aligned notches to another.

16. A clutch mechanism for connecting a drive shaft and a driven shaft, comprising a driving member, a driven member radially spaced from the driving member, and rollers in the space between said members, some of said rollers being cylindrical, and at least one of said rollers being non-circular in cross-section, said non-circular roller having means for locking said driving and driven members together for rotation in either direction.

17. A clutch mechanism of the class described, comprising a driving member and a driven member, a set of rollers between said members, some of said rollers being cylindrical, and some being non-circular in cross-section, said non-circular rollers having means for locking said driving and driven members together for rotation in either direction.

18. A clutch mechanism of the class described, comprising a cylindrical driving member whose exterior surface constitutes an inner raceway surface, a hollow driven member overhanging the driving member and presenting an annular inner cylindrical surface constituting an outer raceway surface spaced from the inner raceway surface, rollers in the annular space between said two raceway surfaces, some of said rollers being cylindrical and some non-circular in cross-section, said non-circular rollers having means for locking together and rotating said driving and driven members in either direction.

DELBERT L. LOTTS.